Patented Oct. 20, 1942

2,299,149

UNITED STATES PATENT OFFICE 2,299,149

METHOD OF REMOVING ORGANIC SULPHUR FROM GASES OR VAPORS

William A. Kemper, Baltimore, Md., assignor to Consolidated Gas Electric Light and Power Company of Baltimore, Baltimore, Md., a corporation of Maryland No Drawing. Application February 20, 1940, Serial No. 319,941

12 Claims. (Cl. 23—3)

This invention relates to the removal of organic sulphur compounds from gases and vapors as exemplified by city gas.

Various procedures have heretofore been proposed for the removal of organic sulphur from gases wherein the gases are passed over heated materials. However, these have not been entirely satisfactory because either in some cases a relatively high temperature was required, or in others the purifying material soon lost its activity. This rapid loss in activity was particularly noted when the proposed processes were tried on gases containing carbureted water gas.

In several of these procedures, alkali or alkaline earth carbonates are components of catalysts for the reduction of organic sulphur to hydrogen sulphide. In one of these, the gas is passed over the carbonates of calcium and magnesium at high temperatures, approximately 600° C. Also, it has been proposed to remove organic sulphur by direct reaction with mixtures of alkali carbonates and iron oxide, but I find that this mixture loses its activity for removing organic sulphur after treating only a small quantity of gas.

I have discovered that an especially efficient removal of organic sulphur from gases and vapors may be obtained through contact, at about 300° C., with a special form of alkali carbonate prepared by decomposition of the alkali bicarbonate at temperatures below 400° C. under such conditions that the salt remains dry and which is herein referred to as reactive alkali carbonate. One way in which this can be effected is to heat the bicarbonate up to the reaction temperature in a stream of gas. The carbonate prepared in this manner, although chemically identical with the commercial carbonates, is more reactive with the organic sulphur. For example, in comparable tests at the same temperature and space velocity, the special sodium carbonate removed 70% more organic sulphur than a commercial "light" solvay soda.

It is therefore an object of this invention to provide a practical method of removing organic sulphur. The method is characterized by a reaction of the organic sulphur compounds with a reactive alkali carbonate, principally to form an alkali sulphate. The reaction takes place at a relatively low temperature and the alkali carbonate remains reactive until nearly completely utilized.

It is also an object of this invention to prepare a form of alkali carbonate which is much more reactive for the removal of organic sulphur than the ordinary carbonates of commerce.

Other objects will appear hereinafter.

The reaction involved appears to be one between the alkali carbonate, traces of oxygen, 0.5–1.0%, commonly occurring in the gas, and such organic sulphur compounds as carbon bisulphide, carbon oxysulphide, and mercaptans, commonly constituting about 80% of the organic sulphur in the gas. This much of the organic sulphur is removed by the present invention. Principally, alkali sulphate is formed. Traces of alkali sulphite are also formed and after the material has been used for some time, some hydrogen sulphide is also formed which may be readily removed from the gas by known methods.

The preferred procedure is as follows:

Gas from which the greater proportion of the hydrogen sulphide has been removed is preheated and passed through a reaction chamber at a temperature of approximately 300° C. and a velocity of approximately 1500 chamber volumes of gas per hour. The reaction chamber is previously charged with sodium bicarbonate and heated to the reaction temperature in a flow of gas sufficient to keep the material dry. From the reaction chamber, the gas is then passed through a heat exchanger and then to the final stage of hydrogen sulphide purification which may be effected by the use of iron oxide in a known manner. In place of preparing the activated carbonate in the reaction chamber, as a part of the purification process, the activated carbonate may be prepared independently and supplied to the reaction chamber as required.

While 300° C. is the temperature at present preferred, higher temperatures have been used satisfactorily, but there appears to be a critical maximum of approximately 400° C., above which the carbonate should not be heated. Otherwise its activity drops to that of commercial carbonates. Temperatures lower than 300° C. may also be used down to 250° C., and even lower if slower rates or gas flow can be used. While a gas flow rate of 1500 chamber volumes per hour is now preferred, this is not critical, as the rate of flow may be materially varied from that rate. Rates of flow as high as 2500 chamber volumes per hour have been used satisfactorily at about 300° C. and rates of flow below 1500 chamber volumes per hour are also permissible provided that when heating the bicarbonate to the reaction temperature, the flow of gas is at a sufficient rate to carry off all the water formed without condensation taking place.

To give a specific illustration, the following typical run is described:

City gas containing 9 grains of organic sulphur per 100 cubic feet was passed through 10-20 mesh lumps of sodium bicarbonate at a rate of 1620 volumes of gas per volume of bicarbonate per hour and the bicarbonate was heated to 300° C. in approximately one hour. While this temperature and rate of gas flow were maintained, a series of organic sulphur determinations was made. At first, 80% removal of the organic sulphur was effected. The removal dropped gradually but remained above 50% for 300 hours, at the end of which time 63% of the carbonate was converted to sulphate. By the employment of several reaction chambers and by the proper rotation of the sequence of these to put the freshly charged units last in line, the high initial removal may be maintained.

It will therefore be perceived that by the present invention a novel method of removing organic sulphur from illuminating gas has been provided whereby a relatively large percentage of the organic sulphur may be removed by chemical reaction without the relatively high temperatures heretofore suggested, as for example when using calcined calcium carbonate. Experience has demonstrated that admixture of iron oxide with the reactive material here employed is unfavorable, and therefore the present invention is carried out without admixing the bicarbonate or carbonate with other than inert materials. Furthermore, the removal of organic sulfur by the special form of carbonates described herein has been found by investigation to be seventy or more per cent higher than by ordinary alkali carbonates heated to the same temperature. The method is highly efficient, experience having demonstrated that as high as 80 to 90% of the organic sulphur present may be removed at rates of gas flow up to 2500 chamber volumes of gas per hour when using the present invention.

While the preferred procedure as to temperatures, rates of gas flow, etc., has been heretofore set out with considerable detail, it is to be expressly understood that the invention is not limited thereto as, in conformity with the foregoing disclosure, the preferred temperature may be departed from within the limits specified, the rate of gas flow may be considerably varied, etc., without departing from the present invention. The special form of carbonate may be charged into the reaction space, already prepared, or as bicarbonate and made accordingly. The charge may be in a solid bed, on a conveyor belt, blown in as a dust, or introduced in some other suitable manner, as is apparent to those skilled in the art. Also the number of stages of the reaction may be varied as well as the stage in the purification of gas at which it is applied. The invention is not limited to the treatment of industrial gases containing carbon monoxide and hydrogen but may be used as well for the desulfurization of hydrocarbon vapors. If traces of oxygen are not present they may be added as required. Heat exchangers may be employed in known manner to abstract heat from the hot treated gas and deliver it to the incoming untreated gas, thus preheating it. Various other changes may be made, as will now be apparent to those skilled in the art, without departing from the spirit of this invention. Reference is therefore to be had to the appended claims for a definition of the invention wherein the term "reactive" as applied to alkaline carbonate is intended to mean that form of alkaline carbonate that is obtained by the dry decomposition of the bicarbonate as hereinbefore explained.

What is claimed is:

1. A method of removing organic sulphur from gases and vapors which includes forming an alkali carbonate that is highly reactive to organic sulphur by decomposing the bicarbonate of said alkali while assuring an absence of water substantially from the initiation of and throughout the formation of said carbonate and maintaining the temperature below 400° C., and flowing the gases or vapors over the activated carbonate while heated to a temperature below 400° C. and above a minimum temperature which is on the order of 250° C.

2. A method of removing organic sulphur from gases and vapors which includes forming an alkali carbonate that is highly reactive to organic sulphur by decomposing the bicarbonate of said alkali while assuring an absence of water substantially from the initiation of and throughout the formation of said carbonate and maintaining the temperature below 400° C., and flowing the gases or vapors over the activated carbonate while heated to a temperature of approximately 300° C.

3. A method of removing organic sulphur from gases and vapors which includes forming an alkali carbonate that is highly reactive to organic sulphur by decomposing the bicarbonate of said alkali while assuring an absence of water substantially from the initiation of and throughout the formation of said carbonate and maintaining the temperature below 400° C., and simultaneously flowing the gases or vapors over the activated carbonate while heated to a temperature below 400° C. and above a minimum temperature which for a flow rate on the order of 2500 chamber volumes per hour is on the order of 250° C.

4. A method of removing organic sulphur from gases and vapors which includes forming an alkali carbonate that is highly reactive to organic sulphur by decomposing the bicarbonate of said alkali while assuring an absence of water substantially from the initiation of and throughout the formation of said carbonate and maintaining a temperature below 400° C., and thereafter flowing the gases or vapors over the activated carbonate while heated to a temperature below 400° C. and above a minimum temperature which for a flow rate on the order of 2500 chamber volumes per hour is on the order of 250° C.

5. A method of removing organic sulphur from gases and vapors which includes charging a reaction chamber with an alkali bicarbonate that is free from moisture, rendering the same highly reactive to organic sulphur by decomposing said bicarbonate at a temperature below 400° C., and passing the gases or vapors therethrough at a temperature below 400° C. and above a minimum temperature on the order of 250° C.

6. A method of removing organic sulphur from gases and vapors which includes forming a highly reactive alkali carbonate by decomposing the bicarbonate of said alkali while maintaining said bicarbonate at a temperature below 400° C. and assuring an absence of water substantially from the initiation of and throughout the formation of said carbonate, and flowing the gases or vapors over the activated carbonate while heated to a temperature below 400° C. and above a minimum temperature which for a flow rate on the order of 2500 chamber volumes per hour is on the order of 250° C.

7. A method of removing organic sulphur from gases and vapors which includes forming an alkali carbonate that is highly reactive to organic sulphur by decomposing the bicarbonate of said alkali while assuring an absence of water substantially from the initiation of and throughout the formation of said carbonate and maintaining a temperature below 400° C., and flowing the gases or vapors at a rate of 1500 to 2500 chamber volumes per hour over the activated carbonate while heated to a temperature below 400° C. and above a minimum temperature on the order of 250° C.

8. A method of removing organic sulphur from gases and vapors which includes forming an alkali carbonate that is highly reactive to organic sulphur by decomposing the bicarbonate of said alkali while assuring an absence of water substantially from the initiation of and throughout the formation of said carbonate and maintaining a temperature below 400° C., flowing the gases or vapors over the activated carbonate while heated to a temperature below 400° C. and above a minimum temperature which is on the order of 250° C., and then flowing the gases or vapors through iron oxide at ordinary temperature to remove hydrogen sulphide.

9. A method of removing organic sulphur from gases and vapors which includes forming a highly reactive alkali carbonate by decomposing the bicarbonate of said alkali while maintaining said bicarbonate at a temperature below 400° C. and assuring an absence of water substantially from the initiation of and throughout the formation of said carbonate, and flowing the gases or vapors through a heat exchanger and an auxiliary heater to bring the gases or vapors to a temperature below 400° C. and above a minimum temperature on the order of 250° C., then over said activated alkali carbonate, and then through the heat exchanger for cooling.

10. A method of removing organic sulphur from gases and vapors which includes forming a highly reactive alkali carbonate by decomposing the bicarbonate of said alkali while maintaining said bicarbonate at a temperature below 400° C. and above a minimum temperature on the order of 250° C. and assuring an absence of water substantially from the initiation of and throughout the formation of said carbonate, and flowing the gases or vapors over said activated alkali carbonate while maintaining substantially said activating temperature.

11. A method of removing organic sulphur from gases and vapors which includes forming an alkali carbonate that is highly reactive to organic sulphur by decomposing the bicarbonate of said alkali while assuring an absence of water substantially from the initiation of and throughout the formation of said carbonate and maintaining a temperature below 400° C., flowing the gases or vapors over said activated carbonate while heated to a temperature below 400° C. and above a minimum temperature which is on the order of 250° C., and maintaining a rate of flow of said gas or vapor of from 1500 to 2500 chamber volumes of gas per hour.

12. A method of removing organic sulphur from gases and vapors which includes the steps of forming a highly reactive alkali carbonate by decomposing the bicarbonate of said alkali while maintaining a temperature below 400° C. and assuring an absence of water substantially from the initiation of and throughout the formation of said carbonate, adding traces of oxygen to the gases or vapors, and flowing the gases or vapors over said activated carbonate while heated to a temperature below 400° C. and above a minimum temperature on the order of 250° C.

WILLIAM A. KEMPER.